United States Patent
Park et al.

(10) Patent No.: US 12,232,019 B2
(45) Date of Patent: Feb. 18, 2025

(54) ELECTRONIC DEVICE FOR CONTROLLING COMMUNICATION FUNCTION, AND OPERATING METHOD THEREFOR

(71) Applicant: Samsung Electronics Co., Ltd., Suwon-si (KR)

(72) Inventors: Youngkyu Park, Suwon-si (KR); Gwangho Lee, Suwon-si (KR); Changhun Lee, Suwon-si (KR); Daejun Kang, Suwon-si (KR); Inshik Kang, Suwon-si (KR); Janggun Bae, Suwon-si (KR); Dongsuk Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 331 days.

(21) Appl. No.: 17/722,173

(22) Filed: Apr. 15, 2022

(65) Prior Publication Data
US 2022/0240170 A1 Jul. 28, 2022

Related U.S. Application Data

(63) Continuation of application No. PCT/KR2020/010394, filed on Aug. 6, 2020.

(30) Foreign Application Priority Data

Oct. 18, 2019 (KR) .................. 10-2019-0129662

(51) Int. Cl.
*H04W 48/16* (2009.01)
*H04W 48/18* (2009.01)
(Continued)

(52) U.S. Cl.
CPC ........... *H04W 48/16* (2013.01); *H04W 48/18* (2013.01); *H04W 60/005* (2013.01); *H04W 76/16* (2018.02); *H04W 88/06* (2013.01)

(58) Field of Classification Search
CPC ... H04W 48/16; H04W 48/18; H04W 60/005; H04W 76/16; H04W 88/06; H04W 8/22;
(Continued)

(56) References Cited

U.S. PATENT DOCUMENTS

2010/0015919 A1* 1/2010 Tian ...................... H04W 8/005
  455/41.2
2011/0299518 A1* 12/2011 Chang .................. H04W 48/18
  370/342
(Continued)

FOREIGN PATENT DOCUMENTS

KR 10-2016-0073171 A 6/2016
KR 10-2017-0022933 A 3/2017
(Continued)

OTHER PUBLICATIONS

International Search Report and Written Opinion of the International Searching Authority dated Nov. 12, 2020, in connection with International Application No. PCT/KR2020/010394, 11 pages.
(Continued)

*Primary Examiner* — Don N Vo

(57) ABSTRACT

Various embodiments of the present disclosure relate to a device and method for controlling a communication function in an electronic device. An electronic device comprises: a wireless communication circuit for supporting first communication and second communication; memory; and at least one processor, the at least one processor configured to: check identification information about a network when connected to the network through the first communication, determine whether the network supports the second communication, on the basis of the identification information about the network and network information related to the second communication, set, on the basis of whether the network supports the second communication, whether a function, related to the second communication, of the electronic device is activated;
(Continued)

and transmit, to the network information related to whether the function, related to the second communication, of the electronic device is activated.

20 Claims, 12 Drawing Sheets

(51) Int. Cl.
*H04W 60/00* (2009.01)
*H04W 76/16* (2018.01)
*H04W 88/06* (2009.01)

(58) Field of Classification Search
CPC ..... H04W 76/11; H04W 76/15; H04W 60/04; H04W 8/245; H04L 63/101
USPC ........................................................ 455/435.1
See application file for complete search history.

(56) References Cited

U.S. PATENT DOCUMENTS

| | | | |
|---|---|---|---|
| 2015/0103744 A1* | 4/2015 | Sun | H04W 88/06 370/328 |
| 2015/0351014 A1 | 12/2015 | Jung et al. | |
| 2016/0174271 A1 | 6/2016 | Jeong et al. | |
| 2017/0055187 A1 | 2/2017 | Kang et al. | |
| 2019/0281442 A1 | 9/2019 | Kim et al. | |
| 2019/0289528 A1 | 9/2019 | Lou et al. | |
| 2020/0053606 A1 | 2/2020 | Jung et al. | |
| 2020/0252897 A1 | 8/2020 | Liu | |
| 2020/0404585 A1* | 12/2020 | Yao | H04W 8/02 |
| 2022/0174464 A1* | 6/2022 | Ohlsson | H04W 76/50 |

FOREIGN PATENT DOCUMENTS

| | | |
|---|---|---|
| KR | 10-1789431 B1 | 10/2017 |
| KR | 10-2018-0037556 A | 4/2018 |
| KR | 10-2019-0089959 A | 7/2019 |
| KR | 10-2019-0106180 A | 9/2019 |
| WO | 2019095379 A1 | 5/2019 |

OTHER PUBLICATIONS

Office Action dated Jul. 19, 2024, in connection with Korean Application No. 10-2019-0129662, 10 pages.
3GPP TS 23.122 V16.3.0 (Sep. 2019), Technical Specification, 3rd Generation Partnership Project; Technical Specification Group Core Network and Terminals; Non-Access-Stratum (NAS) functions related to Mobile Station (MS) in idle mode (Release 16), Sep. 2019, 75 pages.
3GPP TS 24.501 V15.5.0 (Sep. 2019), Technical Specification, 3rd Generation Partnership Project; Technical Specification Group Core Network and Terminals; Non-Access-Stratum (NAS) protocol for 5G System (5GS); Stage 3 (Release 15), Sep. 2019, 480 pages.
3GPP TS 38.331 V15.7.0 (Sep. 2019), Technical Specification, 3rd Generation Partnership Project; Technical Specification Group Radio Access Network; NR; Radio Resource Control (RRC) protocol specification (Release 15), Sep. 2019, 527 pages.
Huawei, et al., "Discussion on RAN2 impacts due to UE N1 mode capability," R2-1904856 (revision of R2-1901873), 3GPP TSG-RAN WG2 Meeting #105bis, Xi'an, China, Apr. 8-12, 2019, 4 pages.

* cited by examiner

ELECTRONIC DEVICE FOR CONTROLLING COMMUNICATION FUNCTION, AND OPERATING METHOD THEREFOR

CROSS-REFERENCE TO RELATED APPLICATIONS

This application is a Bypass Continuation of International Application No. PCT/KR2020/010394 filed on Aug. 6, 2020, which claims priority to Korean Patent Application No. 10-2019-0129662, filed Oct. 18, 2019, the disclosures of which are herein incorporated by reference in their entirety.

BACKGROUND

1. Field

Various embodiments of the disclosure relate to an apparatus and a method for controlling a communication function in an electronic device.

2. Description of Related Art

Through the development of wireless communication technology, electronic devices (e.g., electronic devices for communication) are commonly used in everyday life, and accordingly, the use of content has grown exponentially. Due to this rapid increase in content use, network capacity has gradually reached its limit, and in order to meet wireless data traffic demands increasing after commercialization of a 4th generation (4G) communication system, efforts to develop a communication system (e.g., 5th generation (5G), pre-5G, or new radio (NR)) for transmitting and/or receiving a signal by using a frequency within a high-frequency (e.g., mmWave) band (e.g., a 1.8 GHz or 3 GHz-300 GHz band) have been made.

SUMMARY

A 5G communication system may include a standalone (SA) structure configured by only a 5G communication system, or a non-standalone (NSA) configured to be associated with a 4G communication system. For example, the NSA structure of the 5G communication system may be configured in a dual connectivity (DC) type such that a base station (e.g., eNB) of the 4G communication system processes, as a master base station, data of a user plane and a control plane related to 5G communication, and a base station (e.g., gNB) of the 5G communication system processes data of the user plane as a sub-base station.

Even in a case where an electronic device supporting a 5G communication scheme accesses a network not supporting 5G communication, the electronic device transmits information related to 5G communication to the network, and thus unnecessary overhead may occur in the network. For example, the electronic device may transmit, to a network not supporting 5G communication, data of a control plane related to 5G communication.

Various embodiments of the disclosure provide an apparatus and a method for controlling a function related to 5G communication in an electronic device.

According to various embodiments, an electronic device may include a wireless communication module configured to support first communication and second communication, at least one processor operatively connected to the wireless communication module, and a memory operatively connected to the at least one processor, wherein the memory stores instructions which, when executed, cause the at least one processor to, when accessing a network via the first communication, identify identification information of the network, determine, based on the identification information of the network and network information related to the second communication, whether the network supports the second communication, configure, based on whether the network supports the second communication, whether to activate a function of the electronic device related to the second communication, and transmit, via the wireless communication module and to the network, information related to whether to activate the function of the electronic device related to the second communication.

According to various embodiments, an operation method of an electronic device supporting first communication and second communication may include, when accessing a network via the first communication, identifying identification information of the network, determining, based on the identification information of the network and the network information related to the second communication, whether the network supports the second communication, configuring, based on whether the network supports the second communication, whether to activate a function of the electronic device related to the second communication, and transmitting, to the network, information related to whether to activate the function of the electronic device related to the second communication.

According to various embodiments of the disclosure, an electronic device adaptively activates a function related to 5G communication, based on a result of comparison between network identification information and network information related to 5G communication (e.g., a whitelist or a blacklist), whereby transmission of unnecessary data related to 5G communication can be prevented.

According to various embodiments, an electronic device updates network information related to 5G communication (e.g., a whitelist or a blacklist) by using an operation and management center (OMC) package, and thus the electronic device can update the network information related to 5G communication without updating entire software (e.g., firmware).

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments will be described in detail with reference to the accompanying drawings.

Terms indicating network entities and a term indicating an interface between the network entities used in the following description are examples for convenience of explanation. Therefore, the disclosure may not be limited by the terminologies provided below, and other terms that indicate objects having equivalent technical meanings may be used.

A first communication scheme used in the following description may include legacy communication such as long term evolution (LTE) communication (or 4G communication) and wideband code division multiplexing access (WCDMA), and a second communication scheme may include new radio (NR) communication or 5G communication. However, the disclosure is not limited thereto, and the first communication scheme and the second communication scheme may include a different communication technique.

Figure 1:
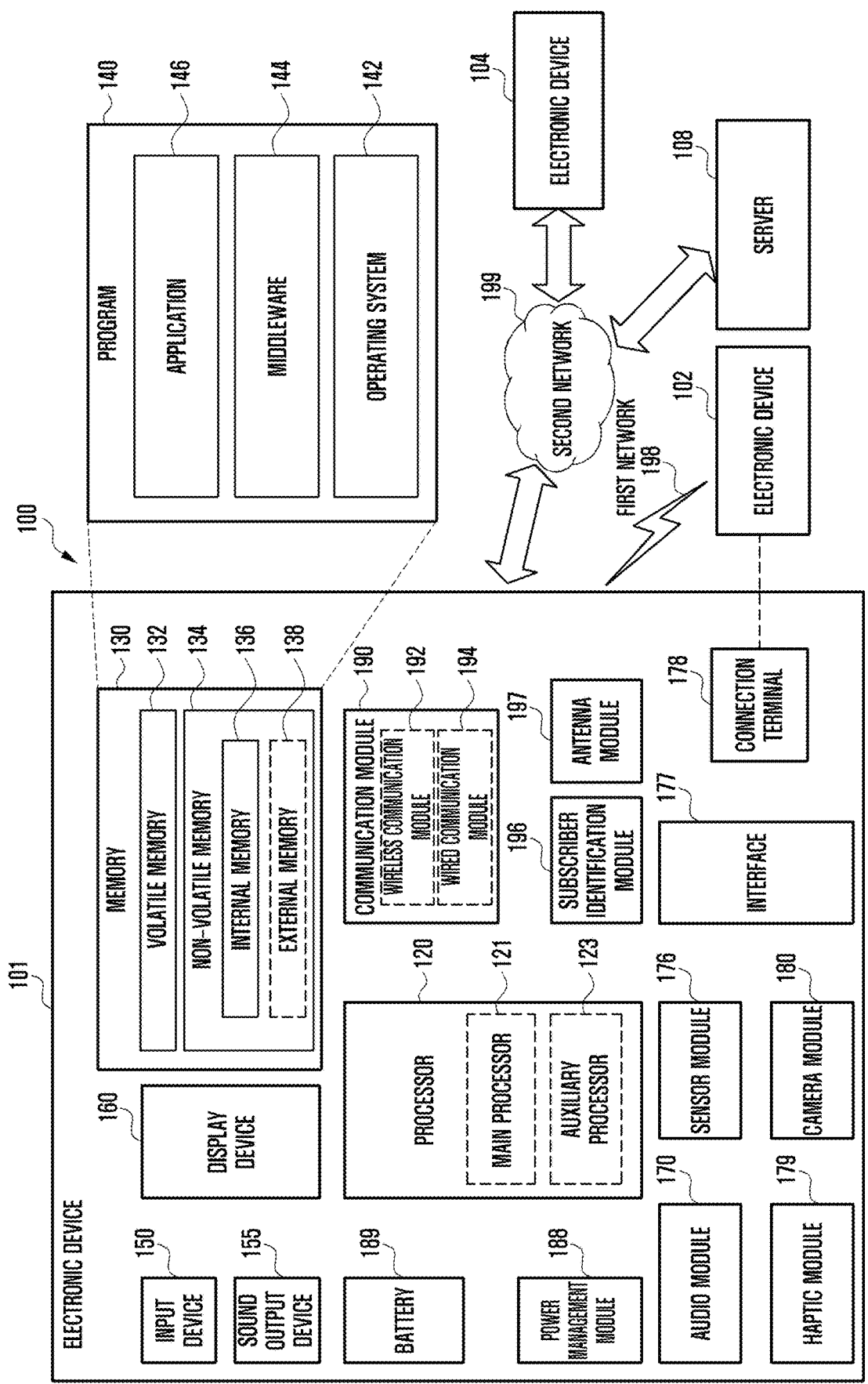
FIG. 1 illustrates a block diagram of an electronic device in a network environment according to various embodiments of the present disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190)

in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and does not include a signal (e.g., an electromagnetic wave), but this term may not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
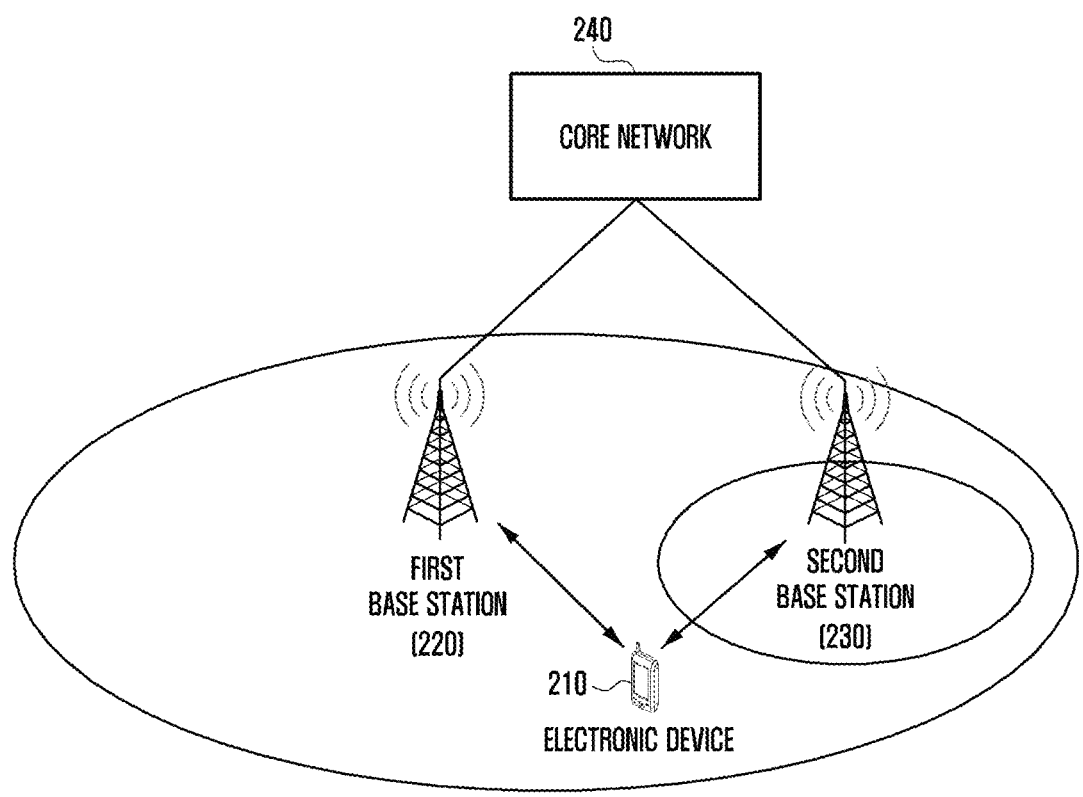
FIG. 2 illustrates a configuration of a second communication system having an NSA structure according to various embodiments of the present disclosure.

FIG. 2 illustrates a configuration of a second communication system having a non-standalone (NSA) structure according to various embodiments of the present disclosure. In the following description, an electronic device 210 may be the electronic device 101 in FIG. 1.

Referring to FIG. 2, according to various embodiments of the present disclosure, in a case where the second communication system has an NSA structure, a second base station 230 of the second communication system is connected to a core network 240 of a first communication system, whereby the first communication system and the second communication system may be configured in a dual connectivity type. According to an embodiment, the electronic device 210 may process data of a user plane and/or a control plane related to second communication via a first base station 220 of the first communication system. The electronic device 210 may process data of a user plane related to the second communication via the second base station 230. For example, the electronic device 210 may transmit and/or receive data independently or collectively via the first base station 220 and the second base station 230. For example, the first base station 220 may include an evolved node B (eNB). For example, the second base station 230 may include a next generation node B (gNB). For example, the core network 240 of the first communication system may include an evolved universal mobile telecommunications system (UMTS) terrestrial radio access network (E-UTRAN). For example, the core network 240 of the first communication system may include an evolved packet core (EPC).

Figure 3:
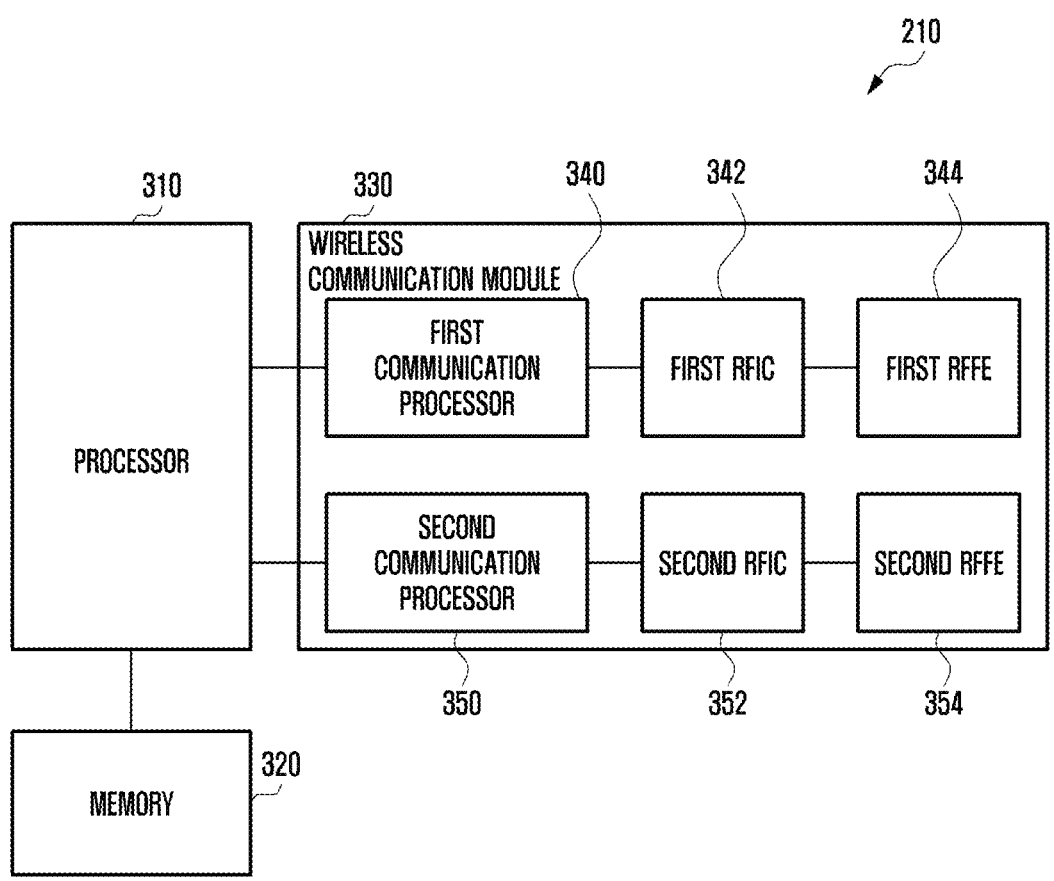
FIG. 3 illustrates a block diagram of an electronic device for controlling a communication function according to various embodiments of the present disclosure.

FIG. 3 illustrates a block diagram of an electronic device for controlling a communication function according to various embodiments of the present disclosure. In the following description, the electronic device 210 may be the electronic device 101 in FIG. 1.

Referring to FIG. 3, the electronic device 210 may include a processor 310, a memory 320, and a wireless communication module 330. According to an embodiment, the processor 310 may be identical to the processor 120 in FIG. 1, or may be included in the processor 120. The memory 320 may be identical to the memory 130 in FIG. 1, or may be included in the memory 130. The wireless communication module 330 may be identical to the wireless communication module 192 in FIG. 1, or may be included in the wireless communication module 192.

According to various embodiments, the wireless communication module 330 may include a first communication processor 340, a second communication processor 350, a first radio frequency integrated circuit (RFIC) 342, a second RFIC 352, a first radio frequency front end (RFFE) 344, and a second RFFE 354.

According to an embodiment, the first communication processor 340 may establish a communication channel within a band to be used for wireless communication having the first communication scheme, and may support communication with a first communication network (e.g., a legacy network) through the established communication channel. According to an embodiment, the second communication processor 350 may establish a communication channel within a band to be used for wireless communication having the second communication scheme, and may support communication with a second communication network (e.g., a 5G network) through the established communication channel. For example, the first communication processor 340 and the second communication processor 350 may be implemented in a single chip or a single package. For example, the first communication processor 340 or the second communication processor 350 may be implemented together with the processor 310 in a single chip or a single package.

According to an embodiment, the first RFIC 342 may convert, at the time of transmission, a baseband signal generated by the first communication processor 340 into a signal having a radio frequency (RF) (e.g., about 700 MHz to 3 GHz), which is used in the first communication network (e.g., a legacy network). At the time of reception, the RF signal may be obtained from the first communication network via an antenna, and may be preprocessed via the first RFFE 344. The first RFIC 342 may convert the RF signal preprocessed by the first RFFE 344 into a baseband signal so that the RF signal can be processed by the first communication processor 340.

According to an embodiment, the second RFIC 352 may convert, at the time of transmission, a baseband signal generated by the second communication processor 350 into an RF signal which is used in the second communication network (e.g., a 5G network). At the time of reception, the RF signal may be obtained from the second communication network via an antenna, and may be preprocessed via the second RFFE 354. The second RFIC 352 may convert the RF signal preprocessed by the second RFFE 354 into a baseband signal so that the RF signal can be processed by the second communication processor 350. For example, the first RFIC 342 and the second RFIC 352 may be implemented as at least a part of a single chip or a single package. For example, the first RFFE 344 and the second RFFE 354 may be implemented as at least a part of a single chip or a single package.

According to various embodiments, the processor 310 may determine, based on identification information of a network which the electronic device 210 attempts to access, whether the network supports the second communication. According to an embodiment, the processor 310 may identify, in an operation and management center (OMC) package received from a network which the electronic device 210 camps on, a mobile country code (MCC)/mobile network code (MNC) value of the network. For example, the OMC package may be received from the network (e.g., the first communication network) which the electronic device 210 camps on, via the first communication processor 340.

According to an embodiment, the processor 310 may determine whether the network supports the second communication, based on a result of a comparison between the MCC/MNC value of the network and network information (e.g., a whitelist or a blacklist) related to the second communication (e.g., NR communication), stored in the memory 320. For example, in a case where the MCC/MNC value of the network is included in a whitelist related to the second communication, which is stored in the memory 320, the processor 310 may determine that the network supports the second communication. In a case where the MCC/MNC value of the network is not included in a whitelist related to the second communication, which is stored in the memory 320, the processor 310 may determine that the network does not support the second communication.

As another example, in a case where the MCC/MNC value of the network is included in a blacklist related to the second communication, which is stored in the memory 320, the processor 310 may determine that the network does not support the second communication. In a case where the MCC/MNC value of the network is not included in a blacklist related to the second communication, which is stored in the memory 320, the processor 310 may determine that the network supports the second communication. For example, the network may include a network which the electronic device 210 attempts to access or a network which the electronic device 210 is connected to.

According to various embodiments, the processor 310 may control a capability (or a communication function) related to the second communication, based on whether the network supports the second communication. According to an embodiment, in a case where it is determined that the network supports the second communication, the processor 310 may activate at least one element related to the second communication (e.g., the second communication processor 350, the second RFIC 352, and/or the second RFFE 354). In a case where it is determined that the network does not support the second communication, the processor 310 may deactivate at least one element related to the second communication.

According to various embodiments, the processor 310 may transmit, to the network, information related to whether the network supports the second communication (or information relating to configuration of the capability of the electronic device 210 related to the second communication). According to an embodiment, the processor 310 may transmit, to the network and through a procedure of registration in the network, the information related to whether the second communication is supported.

For example, in a case where the network supports the second communication, the processor 310 may control the first communication processor 340 to configure "supported" as a DC configuration field of an access request (ATTACH request) message, and transmit the message to the network. In addition, the processor 310 may control the first communication processor 340 to configure "rel 15" as an "AccessStratumRelease" field of capability information of the electronic device 210, and transmit the information to the network. As another example, in a case where the network does not support the second communication, the processor 310 may control the first communication processor 340 to configure "not-supported" as a DC configuration field of an access request message or remove the DC configuration field, and transmit the message to the network.

In addition, the processor 310 may control the first communication processor 340 to configure "rel 14" as an "AccessStratumRelease" field of capability information of the electronic device 210, and transmit the information to the network. For example, the DC configuration field may include a "dual connectivity of E-UTRA with NR capability" field defined in the standard document TS 24.008. The capability information of the electronic device 210 may include "UE-EUTRA-Capability information element" defined in the 3GPP standard specification TS 36.331.

According to various embodiments, the processor 310 may update network information (e.g., a whitelist or a blacklist) related to the second communication (e.g., NR communication) by using an operation and management center (OMC) package of a network which the electronic device 210 is connected to. According to an embodiment, in a case where the processor 310 is registered in a network via the first communication processor 340, the processor may identify a version of an OMC package of the network. In a case where the version of the OMC package of the network is a later version than a version of an OMC package stored in the memory 320, the processor 310 may control the first communication processor 340 to transmit a signal requesting an OMC package to the network. The processor 310 may update the OMC package of the electronic device 210, based on the OMC package received from the network via the first communication processor 340.

In this case, the network information of the electronic device 210 related to the second communication may be updated based on network information related to the second communication included in the OMC package. According to an embodiment, the processor 310 may periodically receive an OMC package from the network and update the OMC package stored in the electronic device 210. In this case, the network information of the electronic device 210 related to the second communication may be updated based on network information related to the second communication included in the OMC package.

For example, the processor 310 may adaptively update the OMC package, based on a version of an OMC package periodically received from the network. According to an embodiment, in a case where OMC package update information is received from the network, the processor 310 may control the first communication processor 340 to transmit a signal requesting an OMC package to the network. The processor 310 may update the OMC package of the electronic device 210, based on the OMC package received from the network via the first communication processor 340. The network information of the electronic device 210 related to the second communication may be updated based on network information related to the second communication included in the OMC package.

According to various embodiments, the memory 320 may store network information (e.g., a whitelist or a blacklist) related to the second communication (e.g., NR communication). According to an embodiment, the memory 320 may store a whitelist or a blacklist related to the second communication, which is updated by the processor 310. For example, the whitelist related to the second communication may include a list of networks supporting the second communication. The blacklist related to the second communication may include a list of networks not supporting the second communication.

According to various embodiments, the first communication processor 340 may perform an operation of the processor 310 related to whether the network supports the second communication. According to an embodiment, the first communication processor 340 may update the network information of the electronic device 210 related to the second communication by using the OMC package. According to an embodiment, the first communication processor 340 may determine, based on the network information of the electronic device 210 related to the second communication and identification information of the network, whether the corresponding network supports the second communication. According to an embodiment, the first communication processor 340 may control a capability related to the second communication, based on whether the network supports the second communication. According to an embodiment, the first communication processor 340 may transmit, to the network, information related to whether the network supports the second communication.

According to various embodiments, an electronic device (e.g., the electronic device 101 in FIG. 1 or the electronic device 210 in FIG. 2 or FIG. 3) may include a wireless communication module (e.g., the wireless communication module 192 or 320) configured to support first communication and second communication, at least one processor (e.g., the processor 120 or 310) operatively connected to the wireless communication module, and a memory (e.g., the memory 130 or 320) operatively connected to the at least one processor, wherein the memory stores instructions which, when executed, cause the at least one processor to, when accessing a network via the first communication, identify identification information of the network, determine, based on the identification information of the network and network information related to the second communication, whether the network supports the second communication, configure, based on whether the network supports the second communication, whether to activate a function of the electronic device related to the second communication, and transmit, via the wireless communication module and to the network, information related to whether to activate the function of the electronic device related to the second communication.

According to various embodiments, the identification information of the network may include a mobile country code (MCC) value and/or a mobile network code (MNC) value.

According to various embodiments, the instructions may be configured to cause the at least one processor to, when the identification information of the network is included in a whitelist in the network information related to the second communication, activate the function related to the second communication, and transmit, via the wireless communication module and to the network, information relating to activation of the function related to the second communication.

According to various embodiments, the instructions may be configured to cause the at least one processor to, when the identification information of the network is not included in the whitelist, deactivate the function related to the second communication, and transmit, via the wireless communication module and to the network, information relating to deactivation of the function related to the second communication.

According to various embodiments, the instructions may be configured to cause the at least one processor to, when the identification information of the network is included in a blacklist in the network information related to the second communication, deactivate the function related to the second communication, and transmit, via the wireless communication module and to the network, information relating to deactivation of the function related to the second communication.

According to various embodiments, the instructions may be configured to cause the at least one processor to, when the identification information of the network is not included in the blacklist, activate the function related to the second communication, and transmit, via the wireless communication module and to the network, information relating to activation of the function related to the second communication.

According to various embodiments, the instructions may be configured to cause the at least one processor to transmit, to the network and based on at least one of an access request (ATTACH request) message or capability information of the electronic device, the information related to whether to activate the function of the electronic device related to the second communication.

According to various embodiments, the instructions may be configured to cause the at least one processor to receive the network information related to the second communication from a server related to a service provider.

According to various embodiments, the network information related to the second communication may be included in an OMC package received from an operation and management center (OMC) server related to the service provider.

According to various embodiments, the first communication may include long-term evolution (LTE) communication, and the second communication may include new radio (NR) communication.

Figure 4:
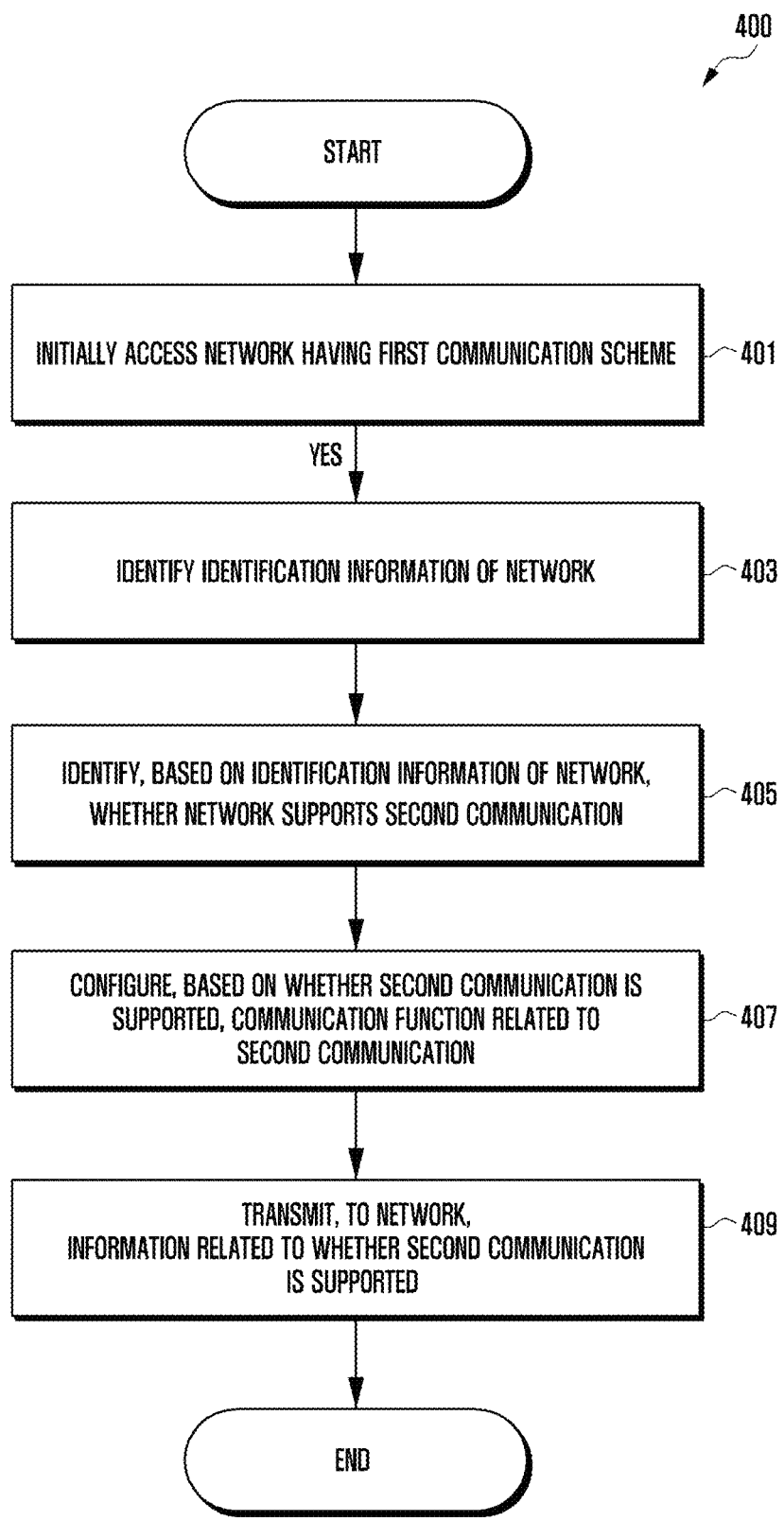
FIG. 4 is a flowchart illustrating control of a communication function in an electronic device according to various embodiments of the present disclosure.

FIG. 4 illustrates a flowchart 400 for controlling a communication function in an electronic device according to various embodiments of the present disclosure. In an embodiment below, operations may be sequentially performed, but the operations are not required to be necessarily sequentially performed. For example, the sequences of operations may be changed, and at least two operations may be performed in parallel. For example, the electronic device may be the electronic device 101 in FIG. 1 or the electronic device 210 in FIG. 2 or FIG. 3.

Referring to FIG. 4, according to various embodiments, an electronic device (e.g., the processor 120 in FIG. 1, the processor 310 in FIG. 3, or the first communication processor 340) may, in operation 410, attempt to perform an initial access to a network using first communication. According to an embodiment, the first communication processor 340 may identify information of a SIM card mounted in the electronic device 210. The first communication processor 340 may camp on a network of a service provider, based on SIM card information. For example, the SIM card information may include at least one of model information and/or a serial number of the electronic device 210, service provider (e.g., a network service provider) information, an MCC, or an MNC.

According to various embodiments, the electronic device (e.g., the processor 120 or 310 or the first communication processor 340) may, in operation 403, identify identification information of the network initially accessed by the electronic device. For example, the identification information of the network may include an MCC/MNC value included in an OMC package received from the network.

According to various embodiments, the electronic device (e.g., the processor 120 or 310 or the first communication processor 340) may, in operation 405, determine whether the network supports second communication, based on the identification information of the network. According to an embodiment, the processor 310 (or the first communication processor 340) may determine, based on a result of a comparison between the identification information of the network and network information related to the second communication (e.g., NR communication), which is stored in the memory 320, whether the corresponding network supports the second communication. For example, the network information related to the second communication (e.g., NR communication) may include a whitelist or a blacklist related to the second communication.

According to various embodiments, the electronic device (e.g., the processor 120 or 310 or the first communication processor 340) may, in operation 407, configure a function (or a capability) of the electronic device 101 or 210 related to the second communication, based on whether the network supports the second communication. According to various embodiments, in a case where it is determined that the network supports the second communication, the processor 310 (or the first communication processor 340) may determine that the electronic device 210 is able to perform the second communication in the corresponding network.

Accordingly, the processor 310 (or the first communication processor 340) may activate at least one element of the electronic device 210 related to the second communication. According to various embodiments, in a case where it is determined that the network does not support the second communication, the processor 310 (or the first communication processor 340) may determine that the electronic device 210 is unable to perform the second communication in the corresponding network. Accordingly, the processor 310 (or the first communication processor 340) may deactivate at least one element of the electronic device 210 related to the second communication. For example, the at least one element of the electronic device 210 related to the second communication may include at least one of the second communication processor 350, the second RFIC 352, or the second RFFE 354 in FIG. 3.

According to various embodiments, the electronic device (e.g., the processor 120 or 310 or the first communication processor 340) may transmit, in operation 409 and to the network, information related to whether the network supports the second communication (or information relating to configuration of the capability of the electronic device 210 related to the second communication). According to an embodiment, the processor 310 (or the first communication processor 340) may transmit, through a procedure of registration in the network, the information related to whether the corresponding network supports the second communication. For example, the information related to whether the network supports the second communication may be included in at least one of a DC configuration field of an access request (ATTACH request) message or an "AccessStratumRelease" field of capability information of the electronic device 210, and then be transmitted.

Figure 5:
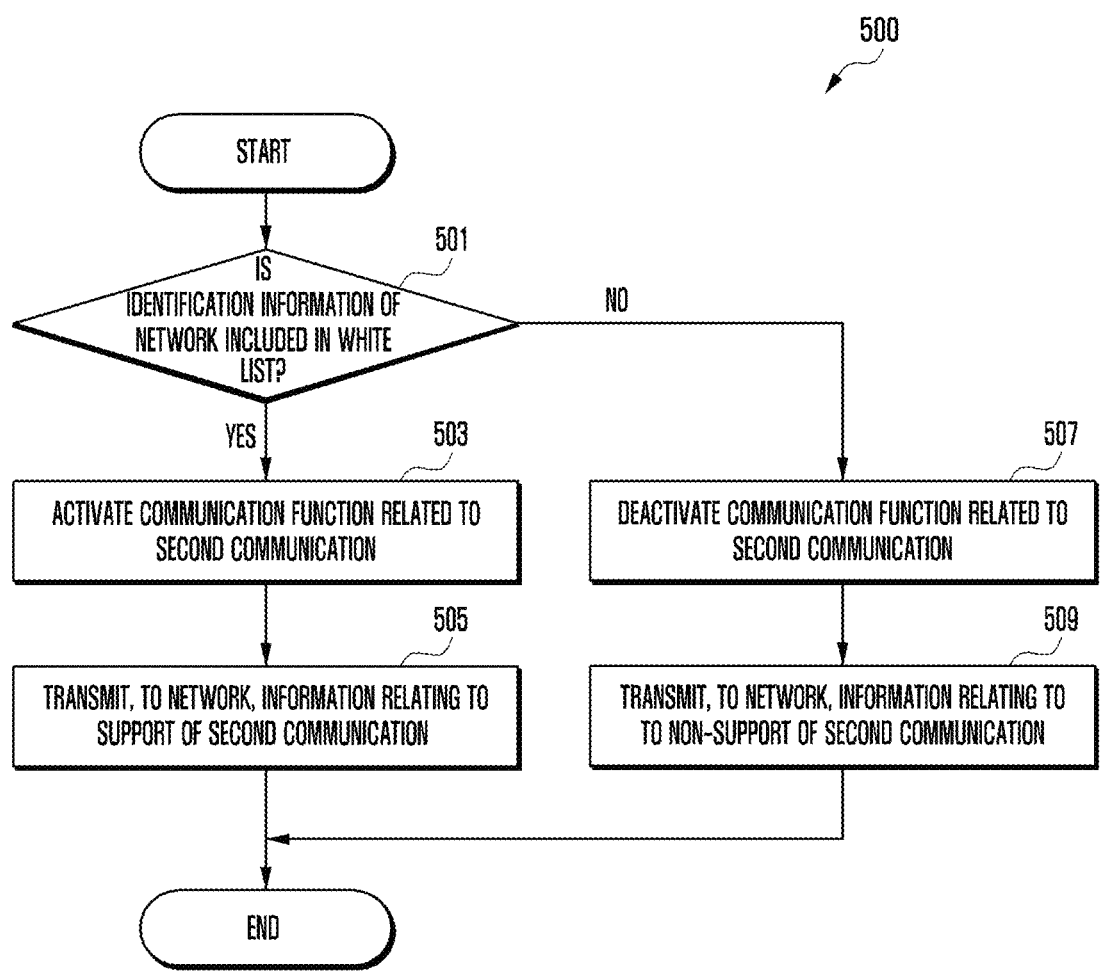
FIG. 5 is a flowchart illustrating control of a communication function in an electronic device, based on a whitelist according to various embodiments of the present disclosure.

FIG. 5 illustrates a flowchart 500 for controlling a communication function in an electronic device based on a whitelist according to various embodiments of the present disclosure. The operations in FIG. 5 described below may be detailed sub-operations of operations 405 to 409 in FIG. 4. In an embodiment below, operations may be sequentially performed, but the operations are not required to be necessarily sequentially performed. For example, the sequences of operations may be changed, and at least two operations may be performed in parallel. For example, the electronic device may be the electronic device 101 in FIG. 1 or the electronic device 210 in FIG. 2 or FIG. 3.

Referring to FIG. 5, according to various embodiments, in a case where identification information of a network initially accessed by the electronic device 101 or 210 is identified (e.g., operation 403 in FIG. 4), an electronic device (e.g., the processor 120 in FIG. 1, the processor 310 in FIG. 3, or the first communication processor 340) may, in operation 501, identify whether the identification information of the network is included in a white list related to second communication, which is stored in the memory 320. For example, the whitelist related to the second communication may include a list of networks supporting the second communication.

According to various embodiments, in a case where the identification information of the network is included in the whitelist related to the second communication (e.g., "YES" in operation 501), the electronic device (e.g., the processor 120 or 310 or the first communication processor 340) may, in operation 503, activate a function (or a capability) of the electronic device 101 or 210 related to the second communication. For example, the activation of the function related to the second communication may include an operation of activating at least one element of the electronic device 210 related to the second communication.

According to various embodiments, the electronic device (e.g., the processor 120 or 310 or the first communication processor 340) may transmit, in operation 505 and to the network, information relating to support of the second communication by the network (or information relating to activation of the function of the electronic device 210 related to the second communication). According to an embodiment, the first communication processor 340 may configure "supported" as a DC configuration field of an access request (ATTACH request) message, and transmit the message to the network. In a case where a capability enquiry message enquiring the capability of the electronic device 210 is received from the network, the first communication processor 340 may configure "rel 15" as an "AccessStratumRelease" field of capability information of the electronic device 210, and transmit the information to the network.

According to various embodiments, in a case where the identification information of the network is not included in the whitelist related to the second communication (e.g., "NO" in operation 501), the electronic device (e.g., the processor 120 or 310 or the first communication processor 340) may, in operation 507, deactivate a function (or a capability) of the electronic device 101 or 210 related to the second communication. According to an embodiment, in a case where the identification information of the network is not included in the whitelist related to the second communication, the processor 310 (or the first communication processor 340) may determine that it is impossible to perform the second communication in the corresponding network. Accordingly, the processor 310 (or the first communication processor 340) may perform control such that at least one element of the electronic device 210 related to the second communication is deactivated.

According to various embodiments, the electronic device (e.g., the processor 120 or 310 or the first communication processor 340) may transmit, in operation 509 and to the network, information relating to non-support of the second communication by the network (or information relating to deactivation of the function of the electronic device 210 related to the second communication). According to an embodiment, the first communication processor 340 may configure "not-supported" as a DC configuration field of an access request message or remove the DC configuration field and transmit the message to the network. In a case where a capability enquiry message enquiring the capability of the electronic device 210 is received from the network, the first communication processor 340 may configure "rel 14" as an "AccessStratumRelease" field of capability information of the electronic device 210, and transmit the information to the network.

Figure 6:
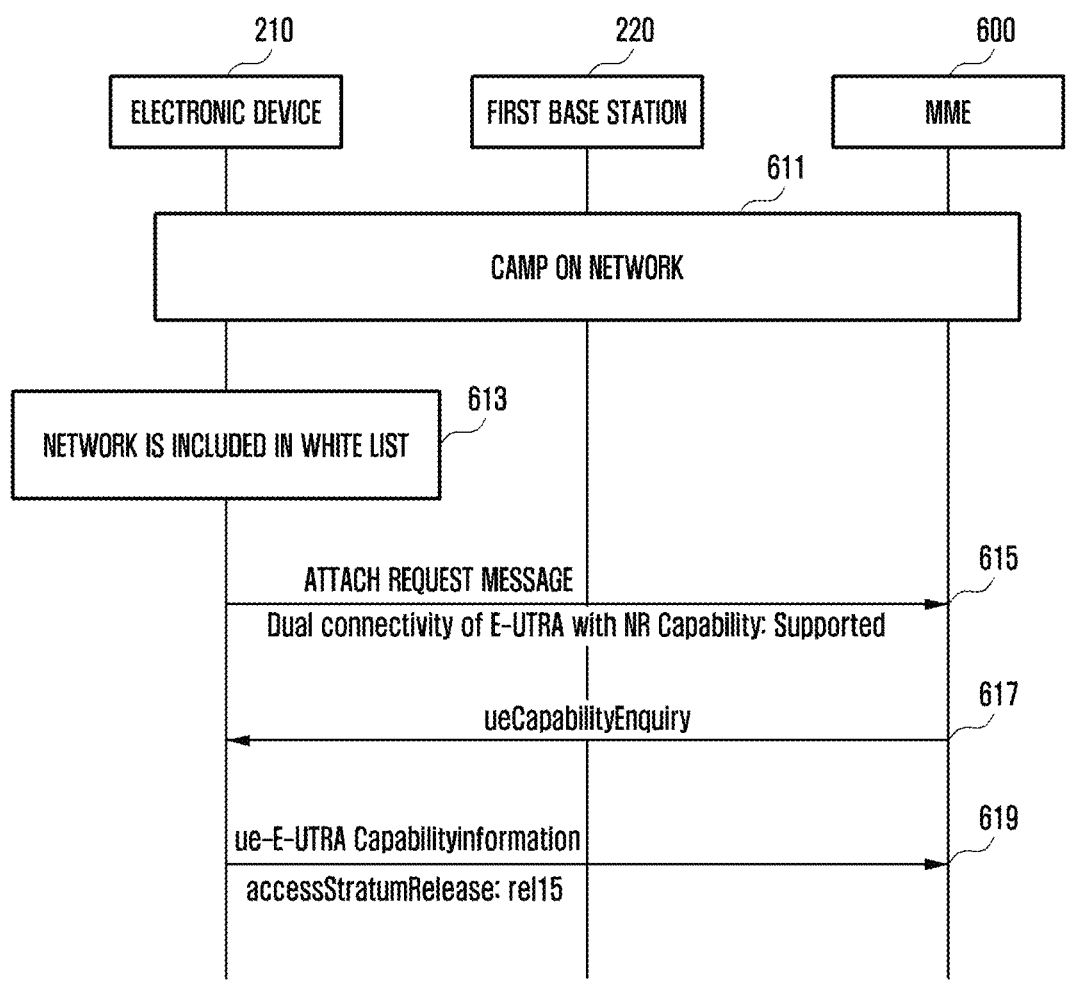
FIG. 6 is a signal flowchart illustrating transmission of 5G communication support information in a wireless communication system according to various embodiments of the present disclosure.

FIG. 6 is a signal flowchart illustrating transmission of 5G communication support information in a wireless communication system according to various embodiments of the present disclosure. The operations in FIG. 6 described below may be detailed sub-operations of operation 505 in FIG. 5. In an embodiment below, operations may be sequentially performed, but the operations are not required to be necessarily sequentially performed. For example, the sequences of operations may be changed, and at least two operations may be performed in parallel.

Referring to FIG. 6, according to various embodiments, the electronic device 210 may camp on a mobile management entity 600 of a network via the first base station 220 (operation 611). For example, camping on may include a configuration in which the electronic device 210 performs an initial access to the network.

According to various embodiments, the electronic device 210 may identify whether identification information of the camped-on network is included in a whitelist related to second communication. According to an embodiment, the electronic device 210 may identify an MCC/MNC value of the corresponding network in an OMC package received from the camped-on network. The electronic device 210 may identify whether the MCC/MNC value of the corresponding network is included in the whitelist related to the second communication, which is stored in the memory 320.

According to various embodiments, in a case where the identification information of the network is included in the whitelist related to the second communication (operation 613), the electronic device 210 may configure "supported" as a "dual connectivity of E-UTRA with NR capability" field of an access request (ATTACH request) message, and transmit the message to the MME 600 via the first base station 220 (operation 615). The MME 600 may determine, based on the access request (ATTACH request) message configured to have "supported" as the "dual connectivity of E-UTRA with NR capability" field, that the electronic device 210 is able to perform the second communication via the corresponding network.

According to various embodiments, the MME 600 may transmit, via the first base station 220 and to the electronic device 210, an enquiry message (UECapabilityEnquiry) related to a capability of the electronic device 210 in order to establish an RRC connection with the electronic device 210 (operation 617). The electronic device 210 may configure "rel 15" as an "AccessStratumRelease" field of capability information (UE-EUTRA-Capability information element) of the electronic device 210 in response to the enquiry message, and transmit the information to the MME 600 via the first base station 220 (operation 619). In a case where "rel 15" is configured as the "AccessStratumRelease" field of the capability information of the electronic device 210, the first base station 220 may determine that the electronic device 210 is able to perform the second communication via the corresponding network. For example, "rel 15" may indicate, in a standard document (3GPP), version information in which a configuration having a DC type related to first communication and second communication is defined.

According to various embodiments, the electronic device 210 may transmit information relating to support of the second communication by the network by using the access request message and the capability information of the electronic device 210, thereby transmitting the information relating to support of the second communication by the network to the MME 600 and the first base station 220 which are restricted from information sharing. For example, the MME 600 and the first base station 220 which are restricted from information sharing may include a state in which at least one of manufacturers or configuration types of the MME 600 and the first base station 220 are different, and thus information sharing between the MME 600 and the first base station 220 is restricted.

Figure 7:
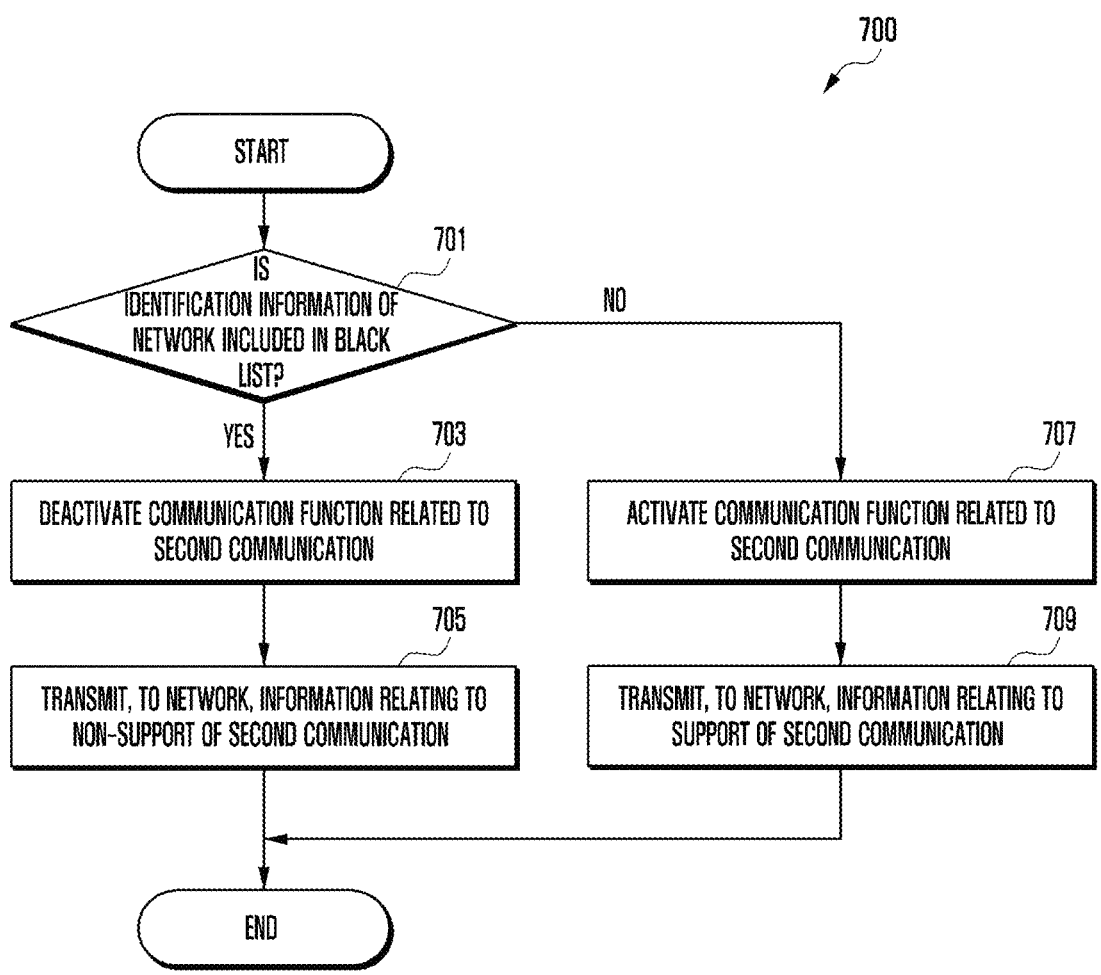
FIG. 7 is a flowchart illustrating control of a communication function in an electronic device based on a blacklist according to various embodiments of the present disclosure.

FIG. 7 illustrates a flowchart 700 for controlling a communication function in an electronic device based on a blacklist according to various embodiments of the present disclosure. The operations in FIG. 7 described below may be detailed sub-operations of operations 405 to 409 in FIG. 4. In an embodiment below, operations may be sequentially performed, but the operations are not required to be necessarily sequentially performed. For example, the sequences of operations may be changed, and at least two operations may be performed in parallel. For example, the electronic device may be the electronic device 101 in FIG. 1 or the electronic device 210 in FIG. 2 or FIG. 3.

Referring to FIG. 7, according to various embodiments, in a case where identification information of a network camped on by the electronic device 101 or 210 is identified (e.g., operation 403 in FIG. 4), an electronic device (e.g., the processor 120 in FIG. 1, the processor 310 in FIG. 3, or the first communication processor 340) may, in operation 701, identify whether the identification information of the network is included in a black list related to second communication, which is stored in the memory 320). According to an embodiment, the processor 310 (or the first communication processor 340) may identify whether an MCC/MNC value of the network is included in a list (blacklist) of networks not supporting the second communication, which is stored in the memory 320.

According to various embodiments, in a case where the identification information of the network is included in the blacklist related to the second communication (e.g., "YES" in operation 701), the electronic device (e.g., the processor 120 or 310 or the first communication processor 340) may, in operation 703, deactivate a function (or a capability) of the electronic device 101 or 210 related to the second communication. According to an embodiment, in a case where the identification information of the network is included in the blacklist related to the second communication, the processor 310 (or the first communication processor 340) may determine that it is unable to perform the second communication in the corresponding network. Accordingly, the processor 310 (or the first communication processor 340) may perform control such that at least one of the second communication processor 350, the second RFIC 352, or the second RFFE 354 related to the second communication is deactivated in the electronic device 210.

According to various embodiments, the electronic device (e.g., the processor 120 or 310 or the first communication processor 340) may transmit, in operation 705 and to the network, information relating to non-support of the second communication by the network (or information relating to deactivation of the function of the electronic device 210 related to the second communication). According to an embodiment, the first communication processor 340 may configure "not-supported" as a DC configuration field of an access request (ATTACH request) message or remove the DC configuration field and transmit the message to the network. In a case where a capability enquiry message enquiring the capability of the electronic device 210 is received from the network, the first communication processor 340 may configure "rel 14" as an "AccessStratumRelease" field of capability information of the electronic device 210, and transmit the information to the network.

According to various embodiments, in a case where the identification information of the network is not included in the blacklist related to the second communication (e.g., "NO" in operation 701), the electronic device (e.g., the processor 120 or 310 or the first communication processor 340) may, in operation 707, activate a function (or a capability) of the electronic device 101 or 210 related to the second communication. According to an embodiment, in a case where the identification information of the network is not included in the blacklist related to the second communication, the processor 310 (or the first communication processor 340) may determine that it is possible to perform the second communication in the corresponding network. Accordingly, the processor 310 (or the first communication processor 340) may perform control such that the second communication processor 350, the second RFIC 352, and the second RFFE 354 related to the second communication is activated in the electronic device 210.

According to various embodiments, the electronic device (e.g., the processor 120 or 310 or the first communication processor 340) may transmit, in operation 709 and to the network, information relating to support of the second communication by the network (or information relating to activation of the function of the electronic device 210 related to the second communication). According to an embodiment, the first communication processor 340 may configure "supported" as a DC configuration field of an access request message, and transmit the message to the network. In a case where a capability enquiry message enquiring the capability of the electronic device 210 is received from the network, the first communication processor 340 may configure "rel 15" as an "AccessStratumRelease" field of capability information of the electronic device 210, and transmit the information to the network.

Figure 8:
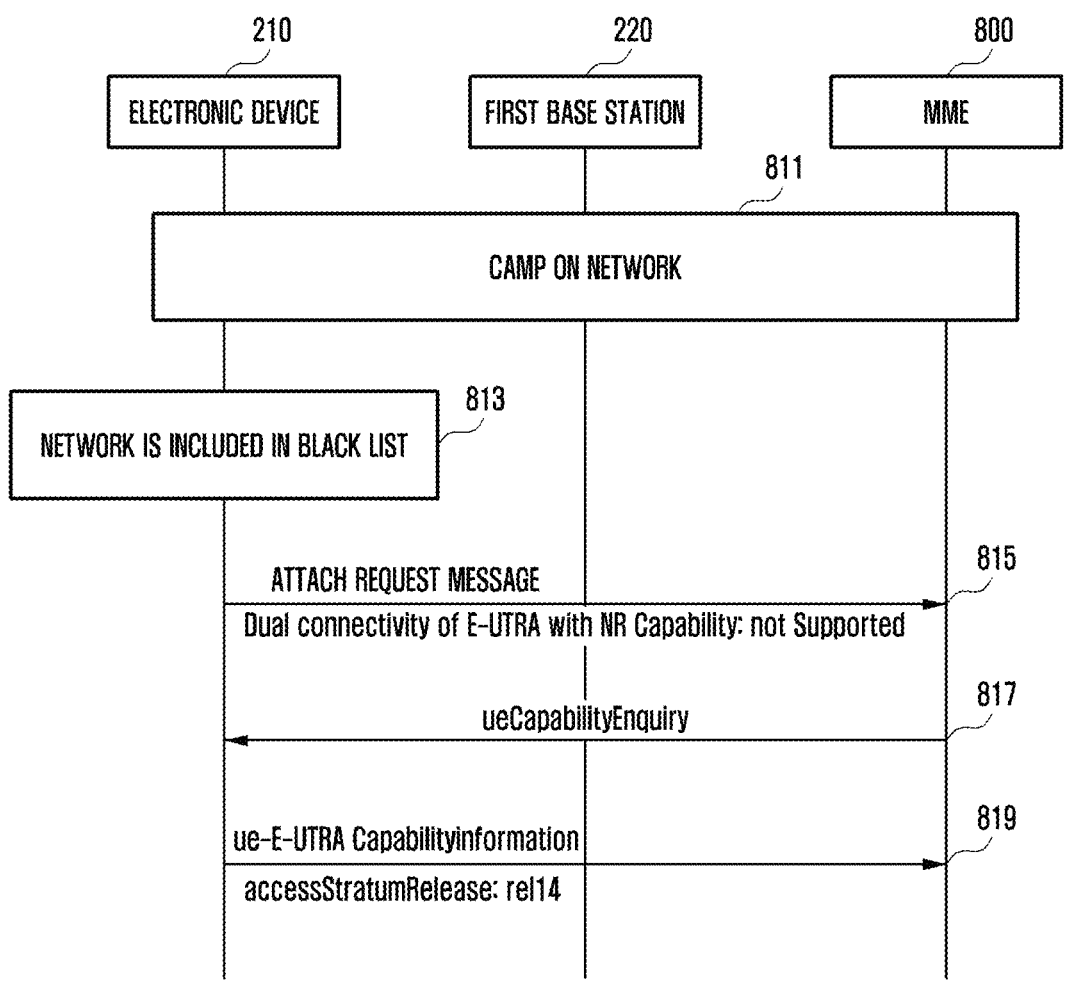
FIG. 8 is a signal flowchart illustrating transmission of 5G communication non-support information in a wireless communication system according to various embodiments of the present disclosure.

FIG. 8 is a signal flowchart illustrating transmission of 5G communication non-support information in a wireless communication system according to various embodiments of the present disclosure. The operations in FIG. 8 described below may be detailed sub-operations of operation 705 in FIG. 7. In an embodiment below, operations may be sequentially performed, but the operations are not required to be necessarily sequentially performed. For example, the sequences of operations may be changed, and at least two operations may be performed in parallel.

Referring to FIG. 8, according to various embodiments, the electronic device 210 may camp on an MME 800 of a network via the first base station 220 (operation 811).

According to various embodiments, in a case where the identification information of the camped-on network is included in a blacklist related to second communication (operation 813), the electronic device 210 may configure "not-supported" as a "dual connectivity of E-UTRA with NR capability" field of an access request (ATTACH request) message, and transmit the message to the MME 800 via the first base station 220 (operation 815). The MME 800 may determine, based on the access request (ATTACH request) message configured to have "not-supported" as the "dual connectivity of E-UTRA with NR capability" field, that the electronic device 210 is unable to perform the second communication via the corresponding network.

According to various embodiments, the MME 800 may transmit, via the first base station 220 and to the electronic device 210, an enquiry message (UECapabilityEnquiry) related to a capability of the electronic device 210 in order to establish an RRC connection with the electronic device 210 (operation 817). The electronic device 210 may configure "rel 14" as an "AccessStratumRelease" field of capability information (UE-EUTRA-Capability information element) of the electronic device 210 in response to the enquiry message, and transmit the information to the MME 800 via the first base station 220 (operation 819). In a case where "rel 14" is configured as the "AccessStratumRelease" field of the capability information of the electronic device 210, the first base station 220 may determine that the electronic device 210 is unable to perform the second communication via the corresponding network. For example, "rel 14" may indicate, in a standard document (3GPP), version information in which a configuration having a DC type related to first communication and second communication is not defined.

According to various embodiments, in a case where the identification information of the camped-on network is included in the blacklist related to the second communication, the electronic device 210 may remove a "dual connectivity of E-UTRA with NR capability" field of an access request (ATTACH request) message, and transmit the message to the MME 800 via the first base station 220. The MME 800 may determine, based on the access request (ATTACH request) message in which the "dual connectivity of E-UTRA with NR capability" field is removed, that the electronic device 210 is unable to perform the second communication via the corresponding network.

According to various embodiments, the electronic device 210 may transmit information relating to non-support of the second communication by the network by using the access request message and the capability information of the electronic device 210, thereby transmitting the information relating to non-support of the second communication by the network to the MME 800 and the first base station 220 which are restricted from information sharing.

Figure 9:
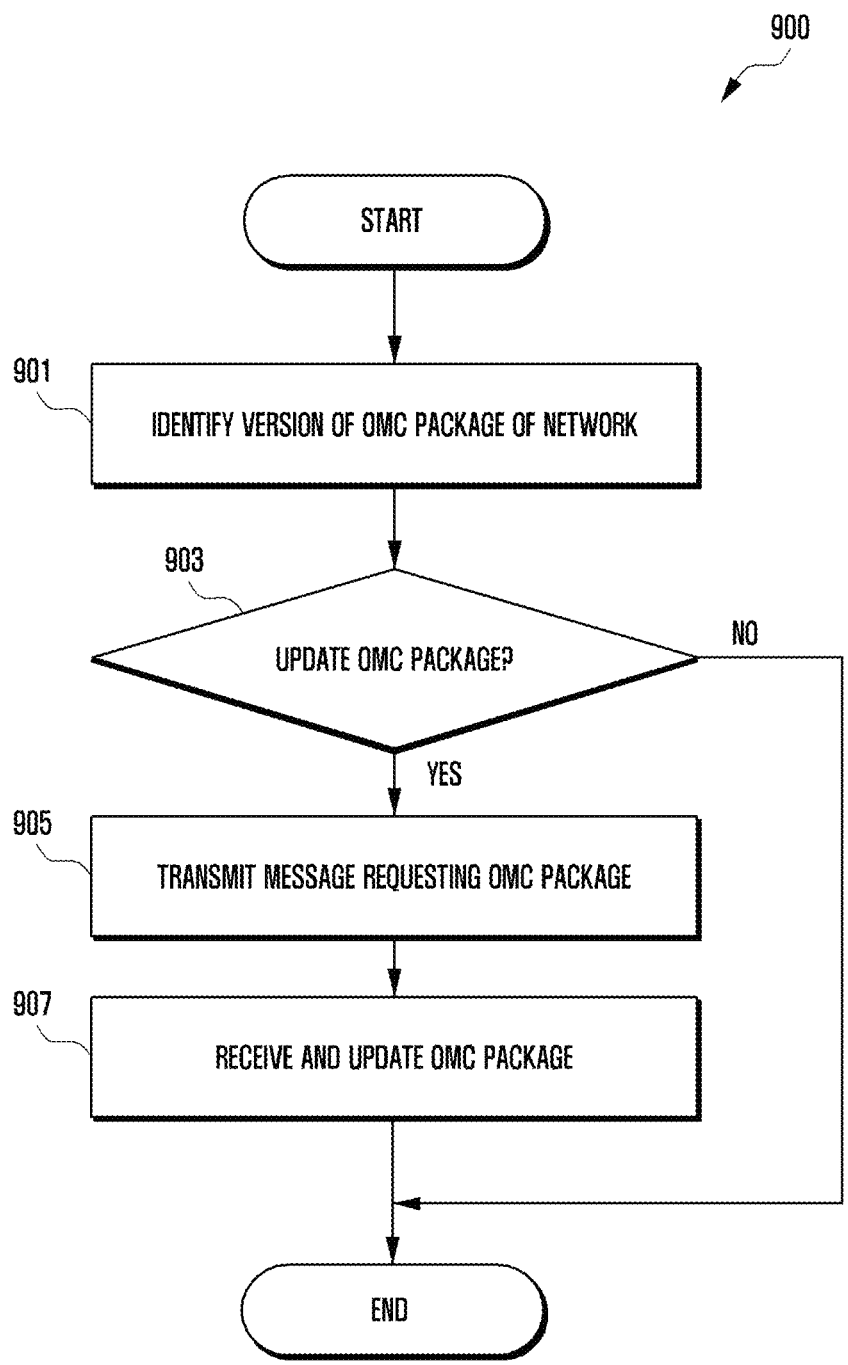
FIG. 9 is a flowchart illustrating update of an OMC package in an electronic device based on a version of the OMC package according to various embodiments of the present disclosure.

FIG. 9 illustrates a flowchart 900 for updating an OMC package in an electronic device based on a version of the OMC package according to various embodiments of the present disclosure. In an embodiment below, operations may be sequentially performed, but the operations are not required to be necessarily sequentially performed. For example, the sequences of operations may be changed, and at least two operations may be performed in parallel. For example, the electronic device may be the electronic device 101 in FIG. 1 or the electronic device 210 in FIG. 2 or FIG. 3.

Referring to FIG. 9, according to various embodiments, an electronic device (e.g., the processor 120 in FIG. 1, the processor 310 in FIG. 3, or the first communication processor 340) may, in operation 901, identify a version of an OMC package of a network which the electronic device 101 or 210 is connected to. According to an embodiment, in a case where the electronic device 210 is registered in a network of a particular service provider (e.g., a network service provider), the processor 310 (or the first communication processor 340) may obtain version information of an OMC package from an OMC server of the corresponding service provider.

According to various embodiments, the electronic device (e.g., the processor 120 or 310 or the first communication processor 340) may, in operation 903, determine, based on the version of the OMC package of the network, whether to update an OMC package of the electronic device 101 or 210. According to an embodiment, in a case where the version of the OMC package provided from the OMC server is a later version than the version of an OMC package stored in the memory 320, the processor 310 (or the first communication processor 340) may determine to update the OMC package of the electronic device 101 or 210. According to an embodiment, in a case where the version of the OMC package received from the OMC server is the same as or earlier than the version of the OMC package stored in the memory 320, the processor 310 (or the first communication processor 340) may determine not to update the OMC package of the electronic device 101 or 210.

According to various embodiments, in a case where it is determined not to update the OMC package of the electronic device 101 or 210 (e.g., "NO" in operation 903), the electronic device (e.g., the processor 120 or 310 or the first communication processor 340) may maintain the OMC package of the electronic device 101 or 210 although not illustrated.

According to various embodiments, in a case where it is determined to update the OMC package of the electronic device 101 or 210 (e.g., "YES" in operation 903), the electronic device (e.g., the processor 120 or 310 or the first communication processor 340) may, in operation 905, transmit a message requesting an OMC package in order to update the OMC package. According to an embodiment, the processor 310 (or the first communication processor 340) may transmit the message requesting an OMC package to an external server (e.g., a content delivery network (CDN)), based on address information (e.g., a uniform resource locator (URL) address) received from the OMC server.

According to various embodiments, the electronic device (e.g., the processor 120 or 310 or the first communication processor 340) may, in operation 907, receive an OMC package in response to the message requesting an OMC package, and update the OMC package of the electronic device 101 or 210. According to an embodiment, the processor 310 (or the first communication processor 340) may store the OMC package received from the external server in a system area via a cache memory in the electronic device 210. For example, network information of the electronic device 210 related to the second communication, which is stored in the memory 320, may be updated based on network information related to the second communication included in the updated OMC package.

Figure 10:
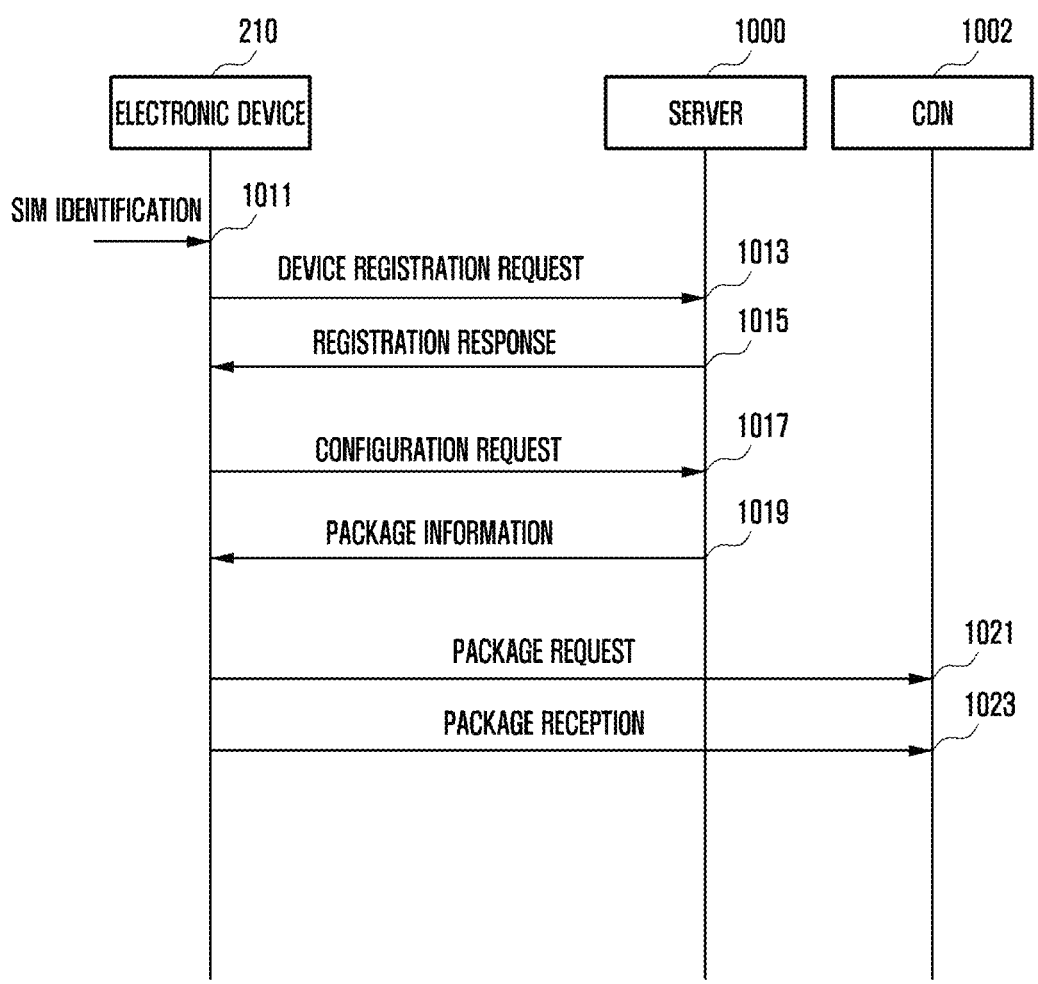
FIG. 10 is a signal flowchart illustrating update of an OMC package in a wireless communication system according to various embodiments of the present disclosure.

FIG. 10 is a signal flowchart illustrating update of an OMC package in a wireless communication system according to various embodiments of the present disclosure. The operations in FIG. 10 described below may be detailed sub-operations of operations 901 to 907 in FIG. 9. In an embodiment below, operations may be sequentially performed, but the operations are not required to be necessarily sequentially performed. For example, the sequences of operations may be changed, and at least two operations may be performed in parallel.

Referring to FIG. 10, according to various embodiments, the electronic device 210 may detect information of a SIM card inserted in the electronic device 210 (operation 1011). According to an embodiment, when power is applied (power on), the electronic device 210 may identify information stored in a SIM card of a particular service provider (e.g., a network service provider), which is inserted in the electronic device 210.

According to various embodiments, the electronic device 210 may transmit a device registration request message including the information of the SIM card inserted in the electronic device 210 to an OMC server 1000 of the corresponding service provider (operation 1013). For example, the device registration request message may include at least one of model information (model name) of the electronic device 210, a sales code, device identification information, service provider (e.g., network service provider) information (SPN), an MCC, or an MNC.

According to various embodiments, the OMC server 1000 may transmit a response message (e.g., a registration response message) for the device registration request message to the electronic device 210 (operation 1015).

According to various embodiments, the electronic device 210 may transmit a configuration request message to the OMC server 1000 (operation 1017). For example, the configuration request message may include at least one of a version of an OMC package of the electronic device 210, service provider (e.g., network service provider) information (SPN), an MCC, or an MNC.

According to various embodiments, the OMC server 1000 may transmit package information to the electronic device 210 in response to the configuration request message (operation 1019). For example, the package information may include at least one of a version of an OMC package stored in the OMC server 1000, or address information (e.g., URL address) related to an external server for downloading of an OMC package.

According to various embodiments, the electronic device 210 may determine whether to receive an OMC package, based on version information of an OMC package received from the OMC server 1000. According to an embodiment, in a case where the version of the OMC package received from the OMC server 1000 is a later version than a version of an OMC package stored in the memory 320 of the electronic device 210, the electronic device 210 may determine to receive an OMC package.

According to various embodiments, in a case where it is determined to receive an OMC package, the electronic device 210 may transmit a package request message to a content delivery network (CDN) 1002 (operation 1021). For example, the package request message may be transmitted to the CDN 1002, based on address information (e.g., a uniform resource locator (URL) address) received from the OMC server 1000.

According to various embodiments, the CDN 1002 may transmit an OMC package to the electronic device 210 in response to the package request message (operation 1023). The electronic device 210 may update the OMC package stored in the memory 320, based on the OMC package received from the CDN 1002.

Figure 11:
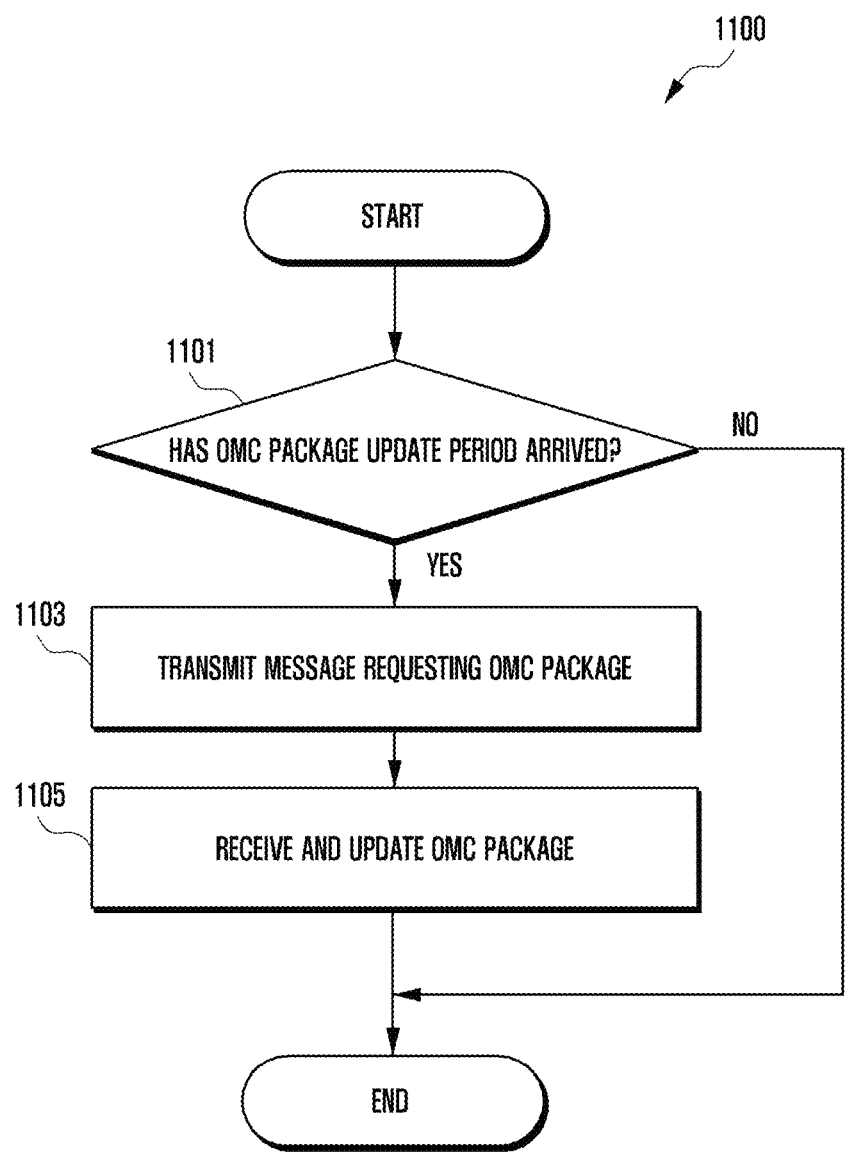
FIG. 11 is a flowchart illustrating periodic update of an OMC package in an electronic device according to various embodiments of the present disclosure.

FIG. 11 illustrates a flowchart 1100 for periodically updating an OMC package in an electronic device according to various embodiments of the present disclosure. In an embodiment below, operations may be sequentially performed, but the operations are not required to be necessarily sequentially performed. For example, the sequences of operations may be changed, and at least two operations may be performed in parallel. For example, the electronic device may be the electronic device 101 in FIG. 1 or the electronic device 210 in FIG. 2 or FIG. 3.

Referring to FIG. 11, according to various embodiments, an electronic device (e.g., the processor 120 in FIG. 1, the processor 310 in FIG. 3, or the first communication processor 340) may, in operation 1101, identify whether an OMC package update period has arrived. For example, the OMC package update period may be received from an OMC server of a service provider.

According to various embodiments, in a case where the OMC package update period has not been arrived (e.g., "NO" in operation 1101), the electronic device (e.g., the processor 120 or 310 or the first communication processor 340) may maintain an OMC package of the electronic device 101 or 210 although not illustrated.

According to various embodiments, in a case where the OMC package update period has arrived (e.g., "YES" in operation 1101), the electronic device (e.g., the processor 120 or 310 or the first communication processor 340) may, in operation 1103, transmit a message requesting an OMC package to the OMC server (or CDN).

According to various embodiments, the electronic device (e.g., the processor 120 or 310 or the first communication processor 340) may, in operation 1105, receive an OMC package in response to the message requesting an OMC package, and update the OMC package of the electronic device 101 or 210. According to an embodiment, an OMC client of the electronic device 210 may identify network information related to second communication in the OMC package received from the OMC server (or CDN). The OMC client may update network information related to the second communication stored in the memory 320 of the electronic device 210, based on the network information related to second communication in the OMC package.

According to various embodiments, in a case where an OMC package is received according to the arrival of the OMC package update period, the electronic device 101 or 210 may adaptively update an OMC package, based on a version of the OMC package. According to an embodiment, in a case where the version of the OMC package received from the OMC server (or CDN) is a later version than a version of an OMC package stored in the memory 320, the electronic device 210 may update the OMC package of the electronic device 101 or 210, based on the OMC package received from the OMC server (or CDN). According to an embodiment, in a case where the version of the OMC package received from the OMC server (or CDN) is the same as or earlier than a version of an OMC package stored in the memory 320, the electronic device 101 or 210 may maintain the OMC package of the electronic device 101 or 210.

Figure 12:
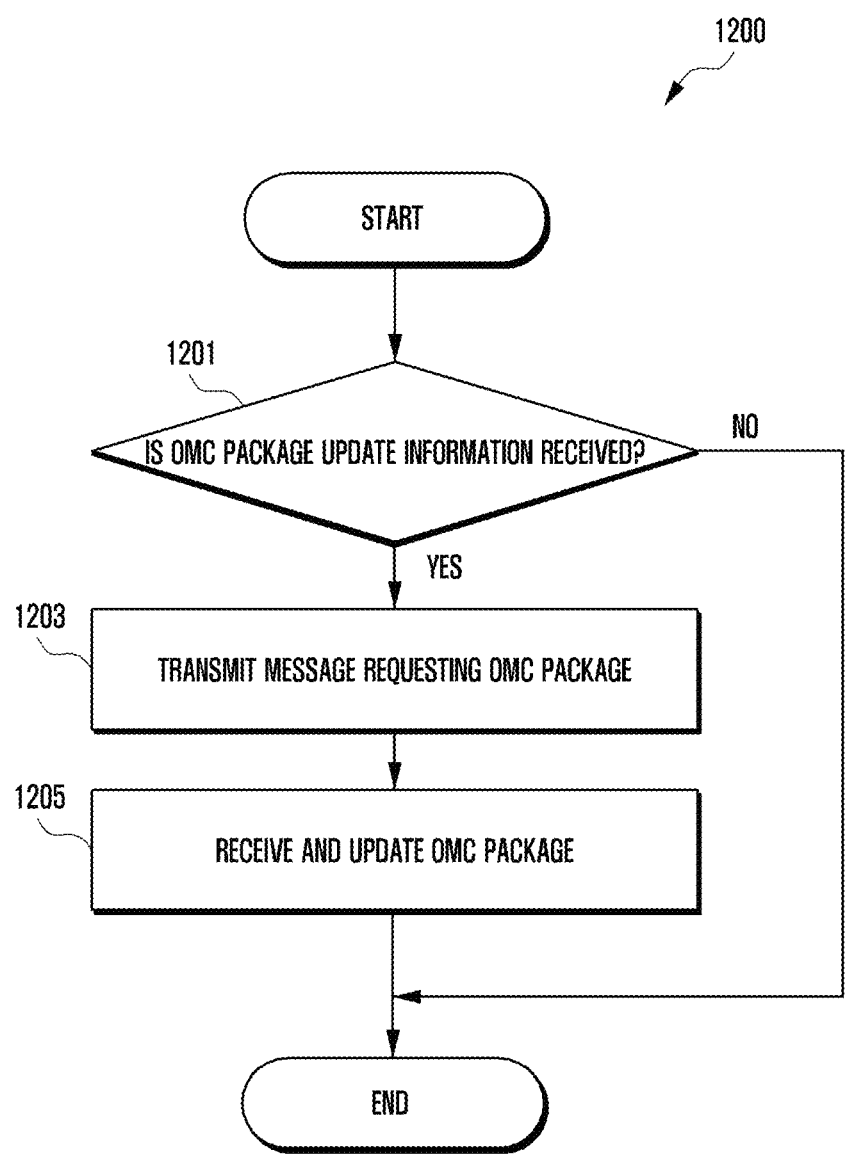
FIG. 12 is a flowchart illustrating update of an OMC package in an electronic device based on a request of a server according to various embodiments of the present disclosure.

FIG. 12 illustrates a flowchart 1200 for updating an OMC package in an electronic device based on a request of a server according to various embodiments of the present disclosure. In an embodiment below, operations may be sequentially performed, but the operations are not required to be necessarily sequentially performed. For example, the sequences of operations may be changed, and at least two operations may be performed in parallel. For example, the electronic device may be the electronic device 101 in FIG. 1 or the electronic device 210 in FIG. 2 or FIG. 3.

Referring to FIG. 12, according to various embodiments, an electronic device (e.g., the processor 120 in FIG. 1, the processor 310 in FIG. 3, or the first communication processor 340) may, in operation 1201, identify whether OMC package update information is received from an OMC server. According to an embodiment, in a case where an OMC package of an OMC server is updated, the OMC package update information may be transmitted to at least one electronic device registered in the OMC server.

According to various embodiments, in a case where the OMC package update information is not received from the OMC server (e.g., "NO" in operation 1201), the electronic device (e.g., the processor 120 or 310 or the first communication processor 340) may maintain an OMC package of the electronic device 101 or 210 although not illustrated.

According to various embodiments, in a case where the OMC package update information is received from the OMC server (e.g., "YES" in operation 1201), the electronic device (e.g., the processor 120 or 310 or the first communication processor 340) may, in operation 1203, transmit a message requesting an OMC package to the OMC server (or CDN).

According to various embodiments, the electronic device (e.g., the processor 120 or 310 or the first communication processor 340) may, in operation 1205, receive an OMC package in response to the message requesting an OMC package, and update the OMC package of the electronic device 101 or 210. According to an embodiment, the processor 310 (or the first communication processor 340) may detect network information related to second communication in an OMC package received from an external server (or OMC server). The processor 310 (or the first communication processor 340) may change network information related to the second communication, which is stored in the memory 320, into the network information related to the second communication detected in the OMC package.

According to various embodiments, an operation method of an electronic device (e.g., the electronic device 101 in FIG. 1 or the electronic device 210 in FIG. 2 or FIG. 3) supporting first communication and second communication may include, when accessing a network via the first communication, identifying identification information of the network, determining, based on the identification information of the network and network information related to the second communication, whether the network supports the second communication, configuring, based on whether the network supports the second communication, whether to activate a function of the electronic device related to the second communication, and transmitting, to the network, information related to whether to activate the function of the electronic device related to the second communication.

According to various embodiments, the identification information of the network may include a mobile country code (MCC) value and/or a mobile network code (MNC) value.

According to various embodiments, the configuring of whether to activate the function related to the second communication may include, when the identification information of the network is included in a whitelist in the network information related to the second communication, activating the function related to the second communication, and when the identification information of the network is not included in the whitelist, deactivating the function related to the second communication.

According to various embodiments, the activating of the function related to the second communication may include activating at least one element related to the second communication in the electronic device.

According to various embodiments, the deactivating of the function related to the second communication may include deactivating at least one element related to the second communication in the electronic device.

According to various embodiments, the configuring of whether to activate the function related to the second communication may include, when the identification information of the network is included in a blacklist in the network information related to the second communication, deactivating the function related to the second communication, and when the identification information of the network is not included in the blacklist, activating the function related to the second communication.

According to various embodiments, the transmitting to the network may include transmitting, to the network and based on at least one of an access request (ATTACH request) message or capability information of the electronic device, the information related to whether to activate the function related to the second communication.

According to various embodiments, the network information related to the second communication may be received from a server related to a service provider.

According to various embodiments, the network information related to the second communication may be included in an OMC package received from an operation and management center (OMC) server related to the service provider.

According to various embodiments, the first communication may include long-term evolution (LTE) communication, and the second communication may include new radio (NR) communication.

Embodiments of the disclosure described and shown in this specification and the drawings have presented specific examples in order to easily explain the technical contents of embodiments of the disclosure and help understanding of embodiments of the disclosure, and are not intended to limit the scope of embodiments of the disclosure. Therefore, the scope of various embodiments of the disclosure should be construed to include, in addition to the embodiments disclosed herein, all changes and modifications that are derived based on the technical idea of various embodiments of the disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
a wireless communication circuit configured to support a first communication and a second communication;
memory operably connected to the wireless communication circuit configured to store network information related to the second communication; and
at least one processor operably connected to the wireless communication circuit and the memory,
wherein the memory is configured to store instructions which, when executed by the at least one processor, cause the electronic device to:
identify identification information of a network for accessing the network via the first communication,
determine, based on the identification information of the network and the network information related to the second communication, whether the network supports the second communication,
deactivate, based on a determination that the network does not support the second communication, a function of the electronic device related to the second communication, and
transmit, to the network via the wireless communication circuit, information relating to deactivation of the function of the electronic device related to the second communication.

2. The electronic device of claim 1, wherein the identification information of the network comprises at least one of a mobile country code (MCC) value or a mobile network code (MNC) value.

3. The electronic device of claim 1, wherein the memory is configured to store instructions which, when executed by the processor, cause the electronic device to:
when the identification information of the network is included in a whitelist in the network information related to the second communication, activate the function related to the second communication; and
transmit, to the network via the wireless communication circuit, information relating to an activation of the function related to the second communication.

4. The electronic device of claim 1, wherein the instructions which, when executed by the processor, cause the electronic device to:
when the identification information of the network is not included in a whitelist, deactivate the function related to the second communication; and
transmit, to the network via the wireless communication circuit, the information relating to the deactivation of the function related to the second communication.

5. The electronic device of claim 1, wherein the instructions which, when executed by the processor, cause the electronic device to:
when the identification information of the network is included in a blacklist in the network information related to the second communication, deactivate the function related to the second communication; and
transmit, to the network via the wireless communication circuit, the information relating to the deactivation of the function related to the second communication.

6. The electronic device of claim 5, wherein the memory is configured to store instructions which, when executed by the processor, cause the electronic device to:
when the identification information of the network is not included in the blacklist, activate the function related to the second communication; and
transmit, to the network via the wireless communication circuit, information relating to activation of the function related to the second communication.

7. The electronic device of claim 1, wherein the instructions which, when executed by the processor, cause the electronic device to: transmit, to the network, the information relating to the deactivation of the function of the electronic device related to the second communication based on at least one of an access request (ATTACH request) message or capability information of the electronic device.

8. The electronic device of claim 1, wherein the instructions which, when executed by the processor, cause the electronic device to: receive, from a server related to a service provider, the network information related to the second communication.

9. The electronic device of claim 8, wherein the network information related to the second communication is included in an operation and management center (OMC) package received from an OMC server related to the service provider.

10. The electronic device of claim 1, wherein the first communication comprises a long-term evolution (LTE) communication, and the second communication comprises a new radio (NR) communication.

11. An operation method of an electronic device supporting a first communication and a second communication, the method comprising:
identifying identification information of a network for accessing the network via the first communication;

determining, based on the identification information of the network and network information related to the second communication, whether the network supports the second communication;

deactivating, based on a determination that the network does not support the second communication, a function of the electronic device related to the second communication; and transmitting, to the network, information relating to deactivation of the function of the electronic device related to the second communication.

12. The method of claim 11, wherein the identification information of the network comprises at least one of a mobile country code (MCC) value or a mobile network code (MNC) value.

13. The method of claim 11, wherein the deactivating of the function comprises:

when the identification information of the network is not included in a whitelist in the network information related to the second communication, deactivating the function related to the second communication.

14. The method of claim 13, further comprising:

when the identification information of the network is included in the whitelist in the network information related to the second communication, activating the function related to the second communication.

15. The method of claim 11, wherein the deactivating of the function comprises :

when the identification information of the network is included in a blacklist in the network information related to the second communication, deactivating the function related to the second communication.

16. The method of claim 15, further comprising:

when the identification information of the network is not included in the blacklist in the network information related to the second communication, activating the function related to the second communication.

17. The method of claim 11, wherein the transmitting to the network comprises: transmit, to the network, the information relating to the deactivation of the function of the electronic device related to the second communication based on at least one of an access request (ATTACH request) message or capability information of the electronic device.

18. The method of claim 11, wherein the network information related to the second communication is received receive from a server related to a service provider.

19. The method of claim 18, wherein the network information related to the second communication is included in an operation and management center (OMC) package received from an OMC server related to the service provider.

20. The method of claim 11, wherein the first communication comprises a long-term evolution (LTE) communication, and the second communication comprises a new radio (NR) communication.

* * * * *